(12) United States Patent
Lou et al.

(10) Patent No.: US 8,885,275 B1
(45) Date of Patent: Nov. 11, 2014

(54) SYSTEM AND METHOD FOR ATI/FTI DETECTION IN MAGNETIC MEDIA

(71) Applicant: HGST Netherlands B.V., Amsterdam (NL)

(72) Inventors: Jing Lou, San Jose, CA (US); Alexander Taratorin, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/133,075

(22) Filed: Dec. 18, 2013

(51) Int. Cl.
*G11B 27/36* (2006.01)
*G11B 5/09* (2006.01)

(52) U.S. Cl.
USPC .............................................. 360/31; 360/45

(58) Field of Classification Search
CPC ................... G11B 20/10305; G11B 20/10398; G11B 20/10407
See application file for complete search history.

(56) References Cited

U.S. PATENT DOCUMENTS

| | | | |
|---|---|---|---|
| 4,306,201 A * | 12/1981 | Nakamura | 330/294 |
| 5,854,554 A | 12/1998 | Tomita et al. | |
| 6,246,729 B1 * | 6/2001 | Richardson | 375/324 |
| 7,123,428 B2 | 10/2006 | Yeo et al. | |
| 7,359,303 B2 | 4/2008 | Mohan et al. | |
| 7,525,307 B2 | 4/2009 | Shen | |
| 7,892,663 B2 | 2/2011 | Nakagawa et al. | |
| 7,929,255 B2 | 4/2011 | Umezaki et al. | |
| 7,932,717 B2 | 4/2011 | Beach et al. | |
| 7,948,708 B2 | 5/2011 | Messner et al. | |
| 2009/0147389 A1 | 6/2009 | Taratorin et al. | |
| 2012/0268112 A1 | 10/2012 | Granger-Brown et al. | |

FOREIGN PATENT DOCUMENTS

WO    WO 2004/039089 A2    5/2004

OTHER PUBLICATIONS

Chang, T.Y., "Dynamic head characterization in the presence of reader nonlinear distortion," IEEE Transactions on Magnetics (Jul. 2004) 40 (4): 1963-1968. Abstract only.
Dodrill et al., "Magnetic in-line metrology for GMR spin-valve sensors," Lake Shore Cryotronics, Inc. (Feb. 3, 2012): 1-11. <http://www.lakeshore.com/Documents/DataTech%20GMR.pdf>.
IBM, "A dynamic kink test to measure sensor instability in GMR head," IBM Technical Disclosure Bulletin (Nov. 7, 2002) < http://ip.com/IPCOM/000016283> Abstract only.
Wilson et al., "Generalized method for measuring read-back nonlinearity using a spin stand," J. Appl. Phys. (1997) 81 (8): 4828-4830.
Wong, Pak-Kin, "Reliability of tunneling magnetoresistance recording head-lifetime, failure mode, and production screening," IEEE Transactions on Magnetics (Feb. 2006) 42 (2): 232-236. Abstract only.

* cited by examiner

*Primary Examiner* — Daniell L Negron
(74) *Attorney, Agent, or Firm* — Billion & Armitage; Michael A. Collins

(57) ABSTRACT

A system detects adjacent track interference (ATI)/far track interference (FTI) in a data storage system. The system includes a micro-transition generator that introduces micro-transitions into data write patterns written to a magnetic media. A spectrum analyzer analyzes in the frequency domain read-back signals generated in response to the data write patterns. In particular, the spectrum analyzer calculates first and second signal-to-noise ratios (SNRs) based on read-back signals generated before and after a center track stress test. Adjacent track interference/far track interference effects are determined based on the first and second SNR values.

13 Claims, 12 Drawing Sheets

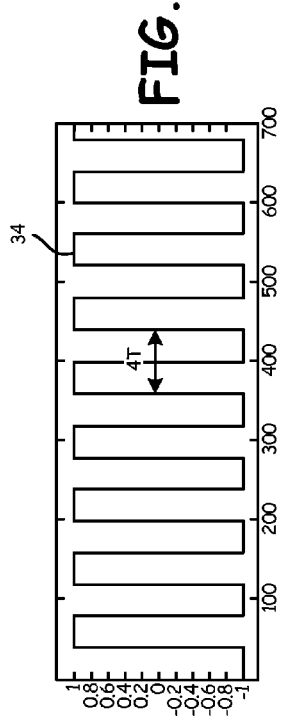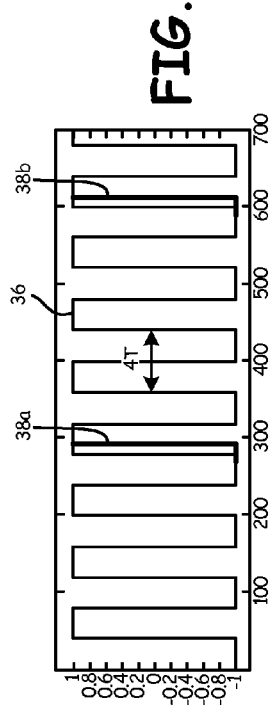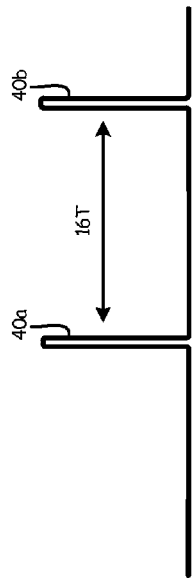

SYSTEM AND METHOD FOR ATI/FTI DETECTION IN MAGNETIC MEDIA

CROSS-REFERENCE TO RELATED APPLICATIONS

Reference is made to application Ser. No. 14/132,966 entitled "System and Method for Testing Data Storage Systems", which is filed on even date and is assigned to the same assignee as this application.

TECHNICAL FIELD

This disclosure relates to data storage systems and in particular to testing of data storage systems.

BACKGROUND

Data storage systems can be incorporated into a wide range of devices, including laptop or desktop computers, tablet computers, digital video recorders, set-top boxes, digital recording devices, digital media players, video gaming devices, video game consoles, cellular telephones, and the like. Magnetic data storage systems include one or more magnetic disks, each comprised of magnetization areas that can be oriented in one of two directions. A magnetic transducer is used to read data from a disk and write data to the disk. Different magnetic recording techniques may be used to store data to the disk. Magnetic recording techniques include, for example, longitudinal magnetic recording (LMR), perpendicular magnetic recording (PMR), and shingled magnetic recording (SMR). Heat assisted magnetic recording (HAMR) may be used with LMR, PMR, or SMR.

Magnetic transducers (in particular those utilizing write heads with trailing and side shield designs) are known to exhibit adjacent track erasure/interference (ATI) and far track erasure/interference (FTI or XTI). This phenomenon results in erasure or partial demagnetization of magnetic transitions recording on side tracks when the center track is being re-written. While ATI effects are generally caused by some amount of fringe fields in the neighborhood of the main recording pole, the origin of FTI effects are complicated. Far track erasure is thought to be caused by "hot spots" in the write head shields, generated by domain wall excitation/switching during head switching. Detection of ATI and FTI effects is a time-consuming and complicated process. A computationally simple and time-effective system and method for identifying ATI/FTI effects would therefore be beneficial.

SUMMARY

A method of detecting adjacent track interference (ATI)/far track interference (FTI) in a data storage system includes introducing micro-transitions into data write patterns. The method further includes writing the data write pattern, including introduced micro-transitions, to a magnetic media at one or more radial positions relative to a center track and then generating a first read-back signal in response to the data write pattern written to the magnetic media. The frequency response of the first read-back signal is analyzed to determine first signal-to-noise ratios (SNRs) associated with the data write patterns written to the magnetic media. A center track stress test is run by repeatedly writing data to the center track for a number of iterations and then generating a second read-back signal in response to the data write pattern written to the magnetic media. The frequency response of the second read-back signal is analyzed to determine second signal-to-noise ratios (SNRs), wherein ATI/FTI effects are determined based on detected changes between the first SNRs and second SNRs.

A system for testing data storage systems includes a micro-transition generator, a write head, a read head, and a spectrum analyzer. The micro-transition generator introduces micro-transitions into a first data write signal, which is written to the data storage system by the write head. The read head generates a first read-back signal in response to the first data write signal written to the magnetic media, and the spectrum analyzer converts the first read-back signal to a frequency domain, and measures a signal-to-noise ratio (SNR) based on a measured amplitude of a micro-transition frequency response and noise floor.

In another embodiment of the present invention, a system detects adjacent track interference (ATI)/far track interference (FTI) in a data storage system. The system includes a micro-transition generator that introduces micro-transitions into first data write patterns, a write head, a read head, and means for analyzing read-back signals in a frequency domain. The write head writes first data patterns to the magnetic media at one or more radial positions relative to center track and performs stress tests by repeatedly writing data to the center track of the magnetic media after the first data write patterns have been written to the magnetic media. The read head generates a first read-back signal in response to the data write pattern prior to the stress test and generates a second read-back signal in response to the data write pattern subsequent to the stress test. The means for analyzing read-back signals in the frequency domain calculates first and second signal-to-noise ratios (SNR) for the first read-back signal and the second read-back signal, respectively, based on micro-transition frequency response of the first and second read-back signals, wherein ATI/FTI effects are determined based on detected changes between the first SNRs and second SNRs.

BRIEF DESCRIPTION OF THE DRAWINGS

FIGS. 3A-3C are waveform diagrams illustrating the introduction of periodic timing disturbances (i.e., micro-transitions) into a data write pattern according to an embodiment of the present invention.

DETAILED DESCRIPTION

The present invention provides a system and method of testing data storage devices. In particular, the present invention introduces timing disturbances into a data pattern written to the magnetic media. The timing disturbances (referred to as micro-transitions) introduce a low-frequency, spectral component into the read-back signal that is substantially independent of read head nonlinearities. The magnitude of the micro-transition frequency response is compared to a noise floor in order to calculate a micro-transition SNR value. Adjacent track interference (ATI) and/or far track interference (FTI) effects are determined by comparing micro-transition SNR values associated with read-back signals measured both before and after the center track stress test.

Figure 1:
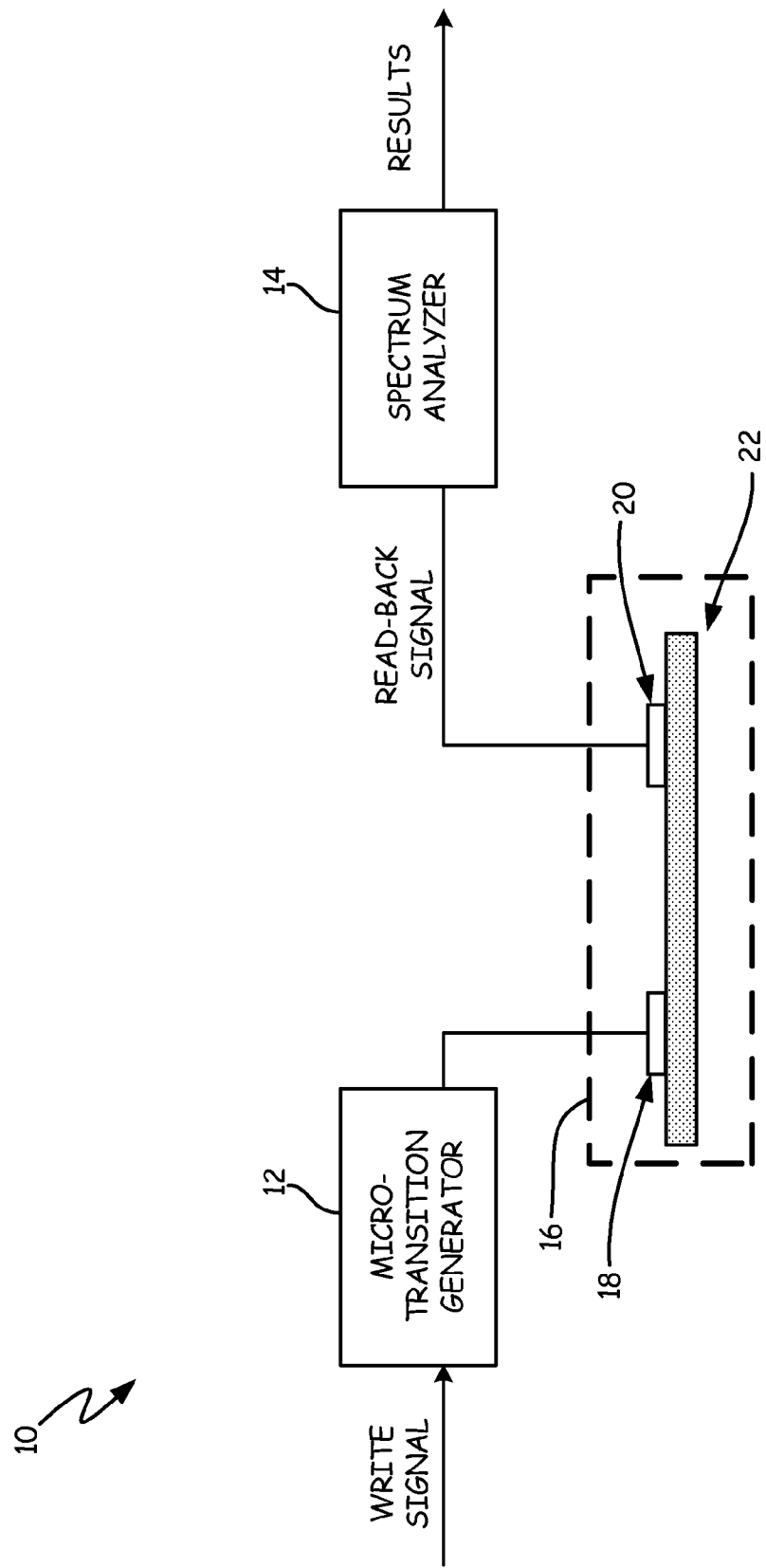
FIG. 1 is a schematic diagram of a magnetic transducer testing system according to an embodiment of the present invention.

FIG. 1 is a schematic diagram of testing system 10 according to an embodiment of the present invention. Testing system 10 includes micro-transition generator 12, spectrum analyzer 14 and data storage system 16, which includes write head 18, read head 20, and magnetic media 22. Although illustrated as geographically distal to one another, write head 18 and read head 20 may be co-located or located near one another. Together, write head 18 and read head 20 may be referred to as magnetic transducer. In one embodiment, data storage system 16 is a spin stand tester capable of testing a plurality of read heads 20 prior to installment of the read heads in a particular application (e.g., hard disk drive (HDD)). In another embodiment, data storage system 16 is a hard disk drive (HDD) or similarly assembled data storage device. In addition, in some embodiments micro-transition generator 12 may utilize circuitry (e.g., precompensation circuitry) included as part of data storage system 16, in which case micro-transition generator 12 would be included as part of data storage system 16.

Testing of data storage system 16, including testing of individual components of data storage system 16 such as write head 18 and read head 20, involves writing a test signal to magnetic media 22 via write head 18, and then generating a read-back signal via read head 20. The term 'testing' refers broadly to verifying or otherwise determining performance of data storage system 16 and components thereof. In particular, testing includes determining bit error rates (BER) levels as well as ATI/FTI effects for the data storage system being tested.

In the embodiment shown in FIG. 1, the write signal is modified by micro-transition generator 12 before being written to magnetic media 22. In particular, micro-transition generator 12 embeds a plurality of small timing disturbances into the write signal referred to as micro-transitions. These micro-transitions in the write signal add a low-frequency (i.e., lower frequency than that of the data write signal) spectral component to the data being written to magnetic media 22. When read head 20 reads the data written to magnetic media 22, the read-back signal will include these spectral components. Analyzing the read-back signal in the frequency domain (i.e., the frequency response of the read-back signal) provides information about the performance of the data storage system 16 as described in co-pending application titled "SYSTEM AND METHOD FOR TESTING DATA STORAGE SYSTEMS", Ser. No. 14/132,966, filed on even data herewith, and incorporated by reference in its entirety. In particular, as described in more detail below, the frequency response to the introduced micro-transitions are free of saturation effects associated with read head 20, and in addition provide a similar roll-off to the noise frequency response. In addition, it has been found that the signal-to-noise ratio defined by the micro-transition frequency response and the noise floor is well-correlated with bit error rate (BER), such that a simple calculation of micro-transition SNR can be used to estimate BER. The micro-transition SNR value can similarly be used to detect degradation in write tracks as a result of ATI/FTI effects.

Spectrum analyzer 14 detects the spectral components associated with the introduced micro-transitions by analyzing and/or converting the read-back signal into the frequency domain. For example, in one embodiment, spectrum analyzer 14 performs a discrete Fourier transform (DFT) of the read-back signal to obtain the frequency response to the read-back signal. In other embodiments, other well-known means of converting a signal from a time domain to a frequency domain may be employed. The frequency response may include both a fundamental frequency associated with the embedded micro-transitions and harmonics thereof, one or more of which may be analyzed to detect parameters of data storage device 16. Analysis of the frequency response by spectrum analyzer 14 may include measuring and storing amplitudes associated with frequency response of the read-back signal, and may additionally include performing calculations based on the measured and stored values. In other embodiments, spectrum analyzer 14 may be responsible only for conversion of the read-back signal from a time domain to a frequency domain, wherein analysis of the frequency response would be left to downstream computing systems. However, for purposes of this discussion, spectrum analyzer 14 is capable of providing both frequency domain conversion and analysis thereof. A benefit of the present invention is that frequency response analysis is computationally simple. The ability to extract performance data from the micro-transition frequency response makes the present invention more time and cost-effective than prior art methods of testing data storage systems.

In the embodiment shown in FIG. 1, spectrum analyzer 14 provides one or more outputs (labeled 'Results') in response to micro-transition frequency response analysis. The 'Results' output may include the measured parameters themselves (e.g., measured amplitudes of frequency responses, measured signal-to-noise ratios, ATI/FTI effects, etc.), or alerts/warnings indicating that the calculated parameters indicate a problem or error associated with data storage system 16.

Figure 2:
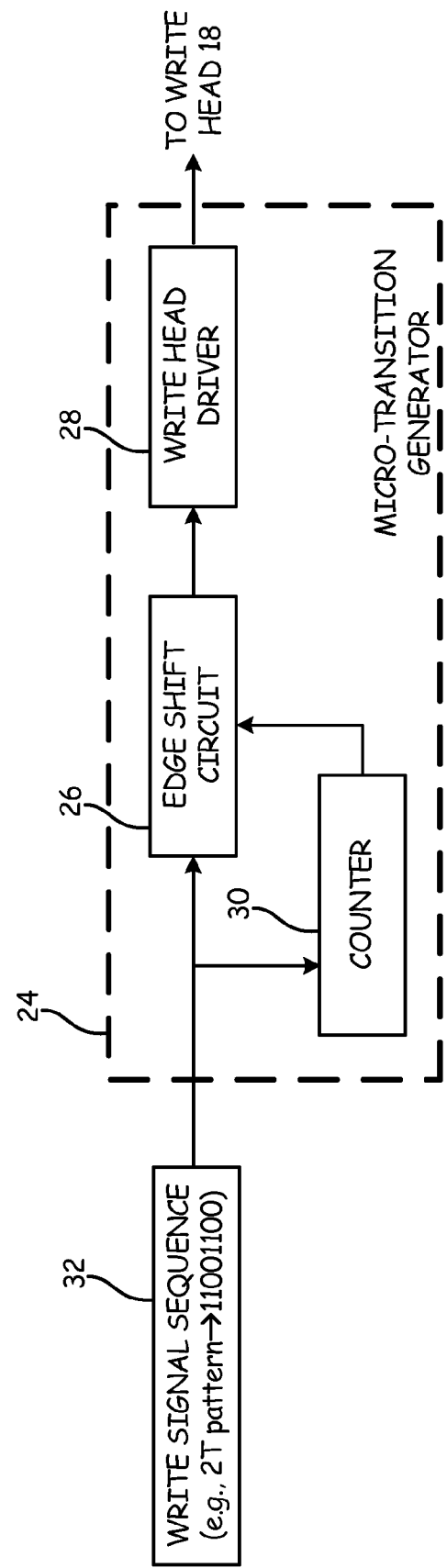
FIG. 2 is a schematic diagram of a micro-transition generator according to an embodiment of the present invention.

FIG. 2 is a schematic diagram of micro-transition generator 24 according to an embodiment of the present invention. Micro-transition generator 24 includes edge-shift circuit 26, write head driver 28, and counter 30. In the embodiment shown in FIG. 2, micro-transition generator 24 operates on a square wave write signal 32 having a 2T pattern (i.e., two positive magnetizations (11), followed by two negative magnetizations (00)), resulting in a square wave with a period of 4T, wherein T denotes the smallest write period possible for a particular data storage device 16. In other embodiments, the period may be modified as desired (e.g., 3T, 8T, 10T, etc.).

In the embodiment shown in FIG. 2, micro-transition generator 24 embeds periodic timing disturbances (i.e., micro-transitions) into square wave write signal 32. Each periodic timing disturbance results in a transition of write signal sequence 32 being advanced (or delayed) by a small amount as shown in more detail with respect to FIGS. 3A-3B. The small, periodic timing shift in the write signal sequence introduces low-frequency, spectral components into the write signal.

In the embodiment shown in FIG. 2, edge shift circuit 26 and counter 30 are responsible for introducing the periodic timing disturbances. In the embodiment shown in FIG. 2, counter 30 monitors write signal sequence 32 and counts transitions associated with the write signal sequence. When a defined count threshold is met (e.g., 8), then counter 30 provides an indication to edge shift circuit 26 to introduce a timing disturbance or micro-transition into the write signal sequence. In other embodiments, counter 30 may not be required to monitor write signal sequence 32, but rather may increment its counter based on an internal clock.

Edge shift circuit 26 receives write signal sequence 32 and input from counter 30, and acts to advance (or delay) write signal sequence 32 by a determined amount (e.g., 10% of the period of the square wave write signal) at a period determined by counter 30. For example, edge shift circuit 26 and counter 30 may be configured to advance (or delay) write signal sequence 32 at every $8^{th}$ transition of write signal sequence 32 (e.g., 2T pattern) to provide micro-transitions at regular 16T intervals. Edge shift circuit 26 provides write signal sequence (including introduced micro-transitions) to write head driver 28, which causes the write signal sequence to be written to write head 18.

In one embodiment, edge shift circuit 26 is a pre-compensation circuit. Typically, pre-compensation circuits are employed to advance or delay a write signal based on the frequency of the write signal sequence in order to more precisely locate transitions on the magnetic media to be written. However, because the function of a pre-compensation circuit is to advance and/or delay a write signal sequence by a determined amount, the pre-compensation circuit may in addition be employed in combination with counter 30 to introduce the desired periodic micro-transitions into the write signal sequence.

FIGS. 3A-3C are waveform diagrams illustrating the introduction of periodic timing disturbances (i.e., micro-transitions) into a write signal sequence (such as write signal sequence 32 shown in FIG. 2) according to an embodiment of the present invention.

In particular, FIG. 3A illustrates square wave write signal 34 having a 2T write pattern. For example, square wave write signal 34 may be the type of write signal that would be generated from write signal sequence 32 (shown in FIG. 2) if no periodic disturbances were introduced into the write signal.

FIG. 3B illustrates square wave write signal 36 after the introduction of periodic micro-transitions 38a and 38b. In the embodiment shown in FIG. 3B, every $8^{th}$ transition of write signal 36 is delayed by a predetermined amount corresponding to the desired width of the micro-transition pulse. However, in other embodiments the transition of write signal 36 (positive or negative) may be advanced, rather than delayed. In one embodiment, the length of the delay (i.e., width of the micro-transition) is selected to be less than 25% of the period of write signal 34. In another embodiment, the length of the delay (i.e., width of the micro-transition pulse) is selected to be approximately 10% of the period of write signal 34.

FIG. 3C illustrates the resulting error signal that results from the insertion of micro-transitions 38a and 38b, wherein the error signal represents the difference between the original square wave write signal 36 and the resulting signal following insertion of micro-transitions 38a and 38b. As illustrated in FIG. 3C, the error signal consists of isolated, unipolar magnetization pulses 40a and 40b. Because the timing shift introduced by the delay (or advancement) of the timing signal is relatively small, the effective "width" of magnetization pulses 40a and 40b is similarly small (e.g., fraction of a nanometer (nm)). As a result, magnetization pulses 40a and 40b are similar to a magnetization delta-function in the down-track direction.

Figure 4:
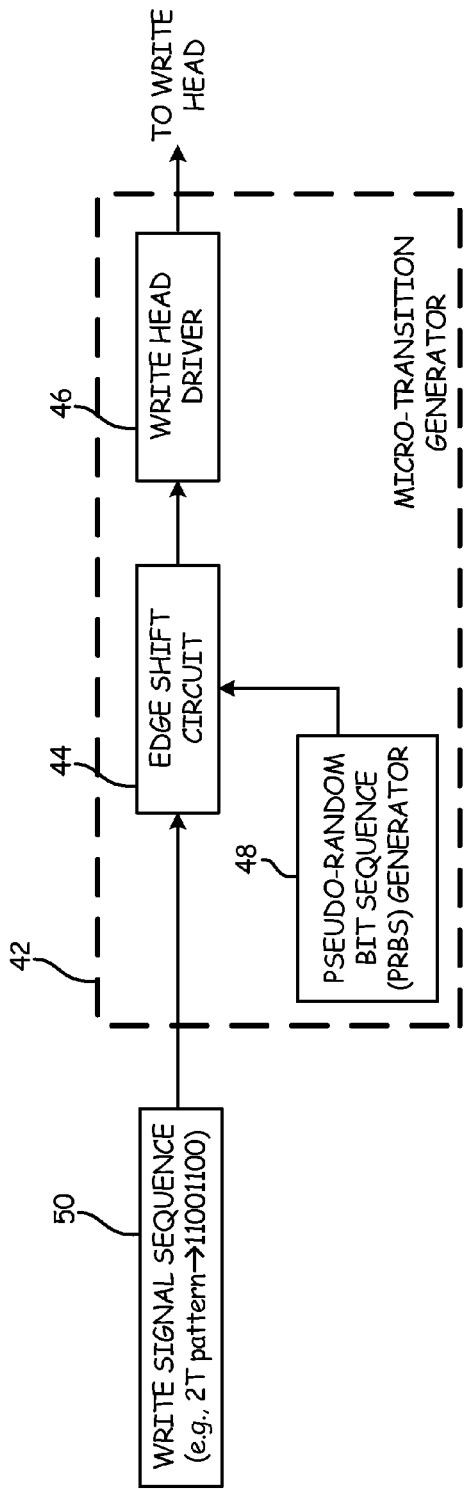
FIG. 4 is a schematic diagram of a micro-transition generator according to another embodiment of the present invention.

FIG. 4 is a schematic diagram of micro-transition generator 42 according to another embodiment of the present invention. The operation of micro-transition generator 42 will be discussed with reference to FIG. 5, which illustrates waveform diagrams of the pseudo-random bit sequence generated by PRBS generator 48 and the resulting write signal sequence as modified by edge shift circuit 44.

Micro-transition generator 42 includes edge shift circuit 44, write head driver 46, and pseudo-random bit sequence (PRBS) generator 48. Micro-transition generator 42 operates to add timing disturbances into write signal sequence 50. However, in contrast with the embodiment shown in FIG. 2, in which timing disturbances (i.e., micro-transitions) were introduced to a square wave write signal, the embodiment shown in FIG. 4 introduces pseudo-random timing disturbances into each transition of write signal sequence 50.

In the embodiment shown in FIG. 4, write signal sequence 50 once again has a 2T write pattern, and is provided as input to edge shift circuit 44, which introduces timing disturbances based on a pseudo-random bit sequence 52 (shown in FIG. 5) generated by PRBS generator 48. Although pseudo-random bit sequence 52 is described as pseudo-random, the sequence will have a defined period. As such, the spectral component introduced to the square wave write signal has a frequency component that can be analyzed in the frequency domain based on amplitude of discrete spectral lines occurring at a particular frequency and harmonics thereof. In contrast, if pseudo-random bit sequence 52 were truly random, then the resulting frequency response to the introduced micro-transitions would not provide discrete spectral lines at a particular frequency and harmonics thereof. An important property of maximal-length pseudo-random sequences (such as those introduced via, for example, a finite state machine PRBS generator) is that all harmonics (except for the DC term) have the same amplitude, as do the harmonics of a periodic series of isolated impulses.

Edge shift circuit 44 adds timing disturbances into write signal sequence 50 by either advancing or delaying transitions associated with write signal sequence 50 based on the state of the pseudo-random bit sequence 52 provided by PRBS generator 48. In one embodiment (shown in FIG. 5), if the pseudo-random bit sequence 52 is logic high (e.g., logic-level '1'), then edge shift circuit 44 delays the transition of write signal sequence 50 by a determined length. Conversely, if pseudo-random bit sequence 52 is logic low (e.g., logic-level '0'), then edge shift circuit 44 advances the transition of write signal sequence 50 by a determined length. For example, the first three transitions (including both positive and negative transitions) of write signal sequence 50 are delayed because during the transitions the pseudo-random bit sequence 52 is logic high. The next transition is advanced because the pseudo-random bit sequence 52 is logic low. In one embodiment, the length of the delay or advancement is predetermined, and remains constant for each transition. However, in other embodiments the length of the delay or advancement may be varied. A benefit of introducing micro-transitions according to a pseudo-random bit sequence is that each transition of write signal sequence 50 is utilized. As a result of modifying every transition, the introduced spectral component will have a higher power component than spectral components introduced at every nth transition. For example, frequency response amplitude of micro-transitions introduced to a 2T write pattern by a pseudo-random bit sequence having a period of 15T will have fifteen times the power of micro-transitions introduced at every $15^{th}$ transition of a 2T write pattern.

In another embodiment, rather than advance/delay the transition of write signal sequence 50 based on the logic level of pseudo-random bit sequence 52, edge shift circuit 44 modifies transitions according to a product of pseudo-random bit sequence 52 and the polarity of the transition. For example, pseudo-random bit sequence 52 are accorded a value of either +1 or −1, and transitions are accorded a value of +1 if rising or −1 if falling. If the product of these values is positive (e.g., (+1)*(+1) OR (−1)*(−1)), then transition is advanced (or delayed). Conversely, if the product of these values is negative (e.g., (+1)*(−1) or (−1)*(+1)), then the transition is delayed (or advanced, as appropriate).

There are several distinctions between the various methods of introducing micro-transitions via PRBS generator 48. For example, in the embodiment in which transitions are advanced or delayed based on the polarity of pseudo-random bit sequence 52, the polarity of the magnetization pulse (i.e., the difference or error) is inverted at every other transition based on the transition direction of the square wave signal. As a result, the period of the pseudo-random sequence is doubled (resulting in a lower frequency spectral component), but also to a frequency response that only includes odd harmonics of the double-length period. In contrast, in the embodiment in which transitions are advanced or delayed based on the product of the pseudo-random bit sequence and the polarity of the transition, the period of the pseudo-random sequence remains unchanged and the frequency response includes both even and odd harmonics.

Edge shift circuit 44 provides write signal sequence 54 (shown in FIG. 5) to write head driver 46, which causes the write signal sequence to be written to write head 18 (shown in FIG. 1). As described with respect to FIG. 2, edge shift circuit 44 may once again be implemented with a pre-compensation circuit to provide the desired delay or advancement of each transition of the write signal.

Figure 5:
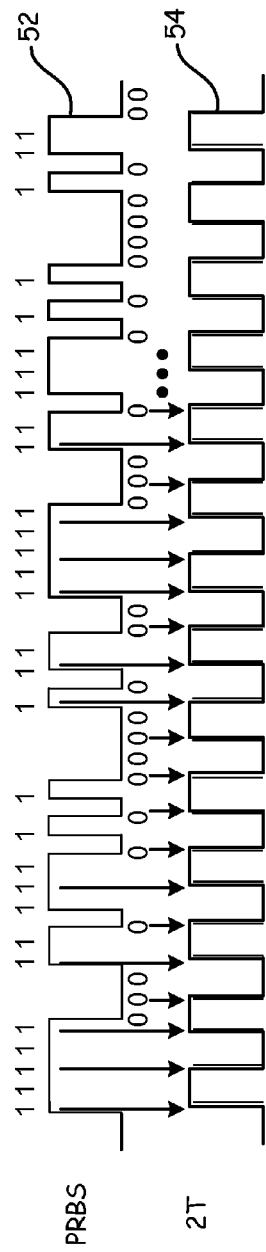
FIG. 5 is a waveform diagram illustrating the introduction of pseudo-random timing disturbances (i.e., micro-transitions) into a data write pattern according to another embodiment of the present invention.

As illustrated in the embodiment shown in FIG. 5, the timing disturbances (i.e., micro-transitions) introduced into the write signal sequence 50 occur at every transition of write signal sequence 50. The resulting error signal between the original write signal sequence 50 and write signal with embedded timing disturbances results in the introduction of a plurality of short magnetization pulses (not shown) that introduce a spectrum component into the write signal and subsequent read-back signal. The spectrum component once again consists of isolated, unipolar transitions. Because the timing shift introduced by the delay (or advancement) of the timing signal is relatively small, the effective "width" of magnetization pulses will once again be small (e.g., fraction of a nanometer (nm)). As a result, the magnetization pulses (not shown) are similar to a magnetization delta-function in the down-track direction. In addition, a benefit of introducing micro-transitions at each transition of write signal sequence 50 is a strong signal-to-noise ratio of the micro-transition frequency response.

Figure 6:
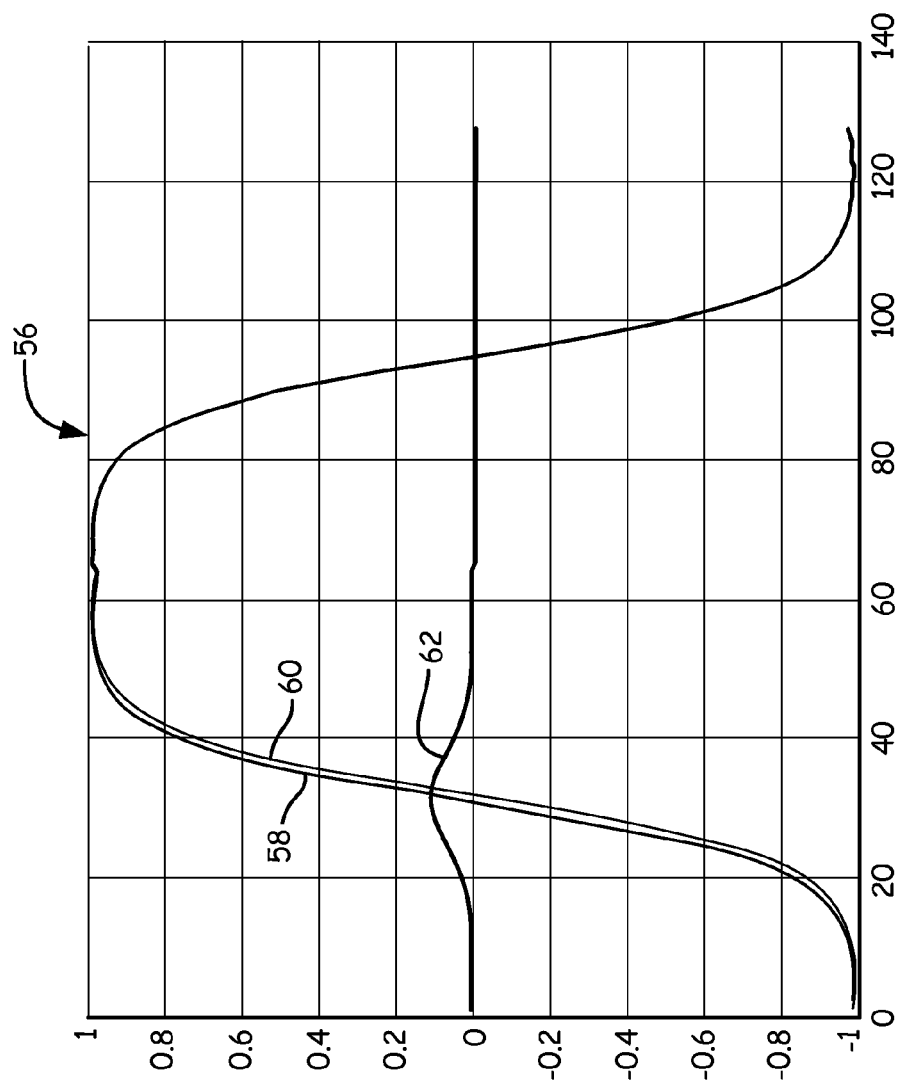
FIG. 6 is a waveform diagram illustrating a read-back signal sensed by a read head that includes a periodic timing disturbance (e.g., micro-transition) according to an embodiment of the present invention.

FIG. 6 is a waveform diagram that illustrates how the introduction of a timing disturbance (i.e., micro-transitions) in the write signal affects the read-back signal generated by read head 20 (shown in FIG. 1). In the embodiment shown in FIG. 6, two read-back signals are shown; read-back signal 58 having an embedded micro-transition, and read-back signal 60 having no embedded micro-transition. Once again, it is understood that read-back signal 58 and read-back signal 60 would not both be generated by read head 20. Rather, the read-back signals are illustrated alongside one another to illustrate the effect of introducing a micro-transition into the write signal.

In the embodiment shown in FIG. 6, the transition of the write signal sequence was advanced by a determined length (as described, for example, with respect to micro-transition generators 24 and 42 shown in FIGS. 2 and 4, respectively), such that read-back signal 58 leads the read-back signal 60. The resulting difference between read-back signal 58 and read-back signal 60 is represented by micro-transition read-back signal 62. The length of the timing disturbance embedded within the write signal (e.g., the width of the micro-transition pulse) determines the amplitude of micro-transition read-back signal 62. In the embodiment shown in FIG. 6, the amplitude of micro-transition read-back signal 62 is maintained within the linear region L1 (e.g., between approximately −0.6 and 0.6) of the read sensor 20. Outside of the linear region L1, saturation of read sensor 20 introduces non-linearities into the read-back signal. Operation in the linear region L1 is a function, in part, of the period of the write signal to which the micro-transitions are introduced (described in more detail with respect to FIGS. 10A-12). For example, micro-transitions introduced into a write signal sequence 50 having a small response (e.g., a period of 2T) will provide a response in the linear region L1, while a write signal sequence 50 having a larger signal response (e.g., a period of 10T) will experience more distortion due to saturation of read head sensor 20. In this way, proper selection of the write signal sequence 50 allows the performance of read sensor 20 to be analyzed without having to account for nonlinearities of read sensor 20.

Figure 7:
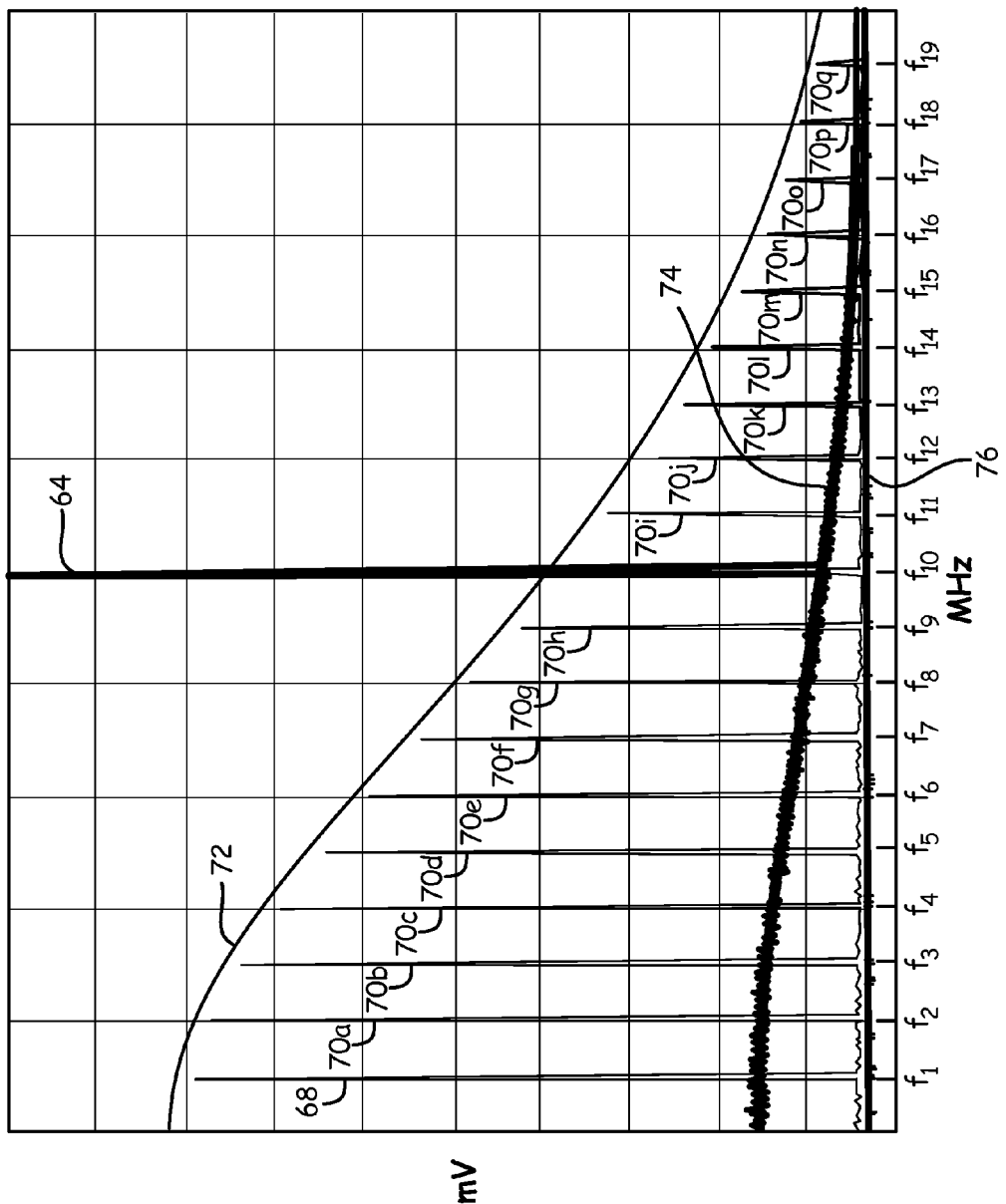
FIG. 7 is a frequency domain diagram illustrating the frequency response of the read-back signal sensed by the read head according to an embodiment of the present invention.

FIG. 7 is a frequency domain diagram illustrating the frequency response of the read-back signal sensed by the read head according to an embodiment of the present invention. The x-axis represents frequency expressed in units of Mega-Hertz (MHz), while the y-axis represents amplitude of the frequency response expressed in units of milli-Volts (mV). For example, spectrum analyzer 14 (shown in FIG. 1) generates a frequency response such as that shown in FIG. 7 in response to a read-back signal provided by read head 20.

The frequency response illustrated in FIG. 7 is described with reference to a 2T write pattern having a 4T period that includes periodic micro-transitions provided at every $10^{th}$ transition, resulting in a micro-transition period of 20T. A similar frequency response can be obtained by introducing pseudo-random timing disturbances into the write signal as described with respect to FIGS. 4 and 5. In the embodiment shown in FIG. 7, the 4T period of the write signal results in a 4T fundamental frequency 64 centered at frequency $f_{10}$. The 20T period of the introduced micro-transitions results in a 20T fundamental frequency 68 centered at frequency $f_1$. In addition, a plurality of harmonics 70a-70q of 20T fundamental frequency 68 are provided at multiples of frequency f1 (e.g., $f_2$-$F_{19}$).

As described above with respect to FIG. 6, the selection of the write signal sequence period ensures that read-back of the introduced micro-transitions are provided within the linear range of read sensor 20. This is illustrated in FIG. 7, in which the amplitude of the 20T fundamental frequency 64 associated with the micro-transitions is less than the amplitude of the 4T fundamental frequency 67 associated with the write signal. It should be noted that the amplitude of the 4T fundamental frequency 64 has been truncated to allow the micro-transition frequency response to be illustrated more easily. In addition, FIG. 7 illustrates the roll-off in amplitudes associated with harmonics 70a-70q (illustrated by curve 72) as well as the roll-off associated with noise floor 74. In particular, FIG. 7 illustrates that the roll-off associated with the frequency response associated with noise floor 74 approximates the roll-off associated with the frequency response to the introduced micro-transitions (line 72). Based on this correlation, the introduction of micro-transitions and subsequent frequency response of the read-back signal to the introduced micro-transitions can be used to estimate the jitter and DC noise associated with data storage system 16 (shown in FIG. 1), and in particular to the magnetic media 22 associated with the data storage device as described in co-pending patent application titled "SYSTEM AND METHOD FOR READ HEAD TESTING", filed on even date herewith and previously incorporated by reference. In addition, as illustrated in FIG. 8, there is an approximate linear correlation between micro-transition signal-to-noise ratio (SNR) and bit error rates (BER), such that micro-transition SNR can be used to estimate BER associated with data storage system 16.

Figure 8:
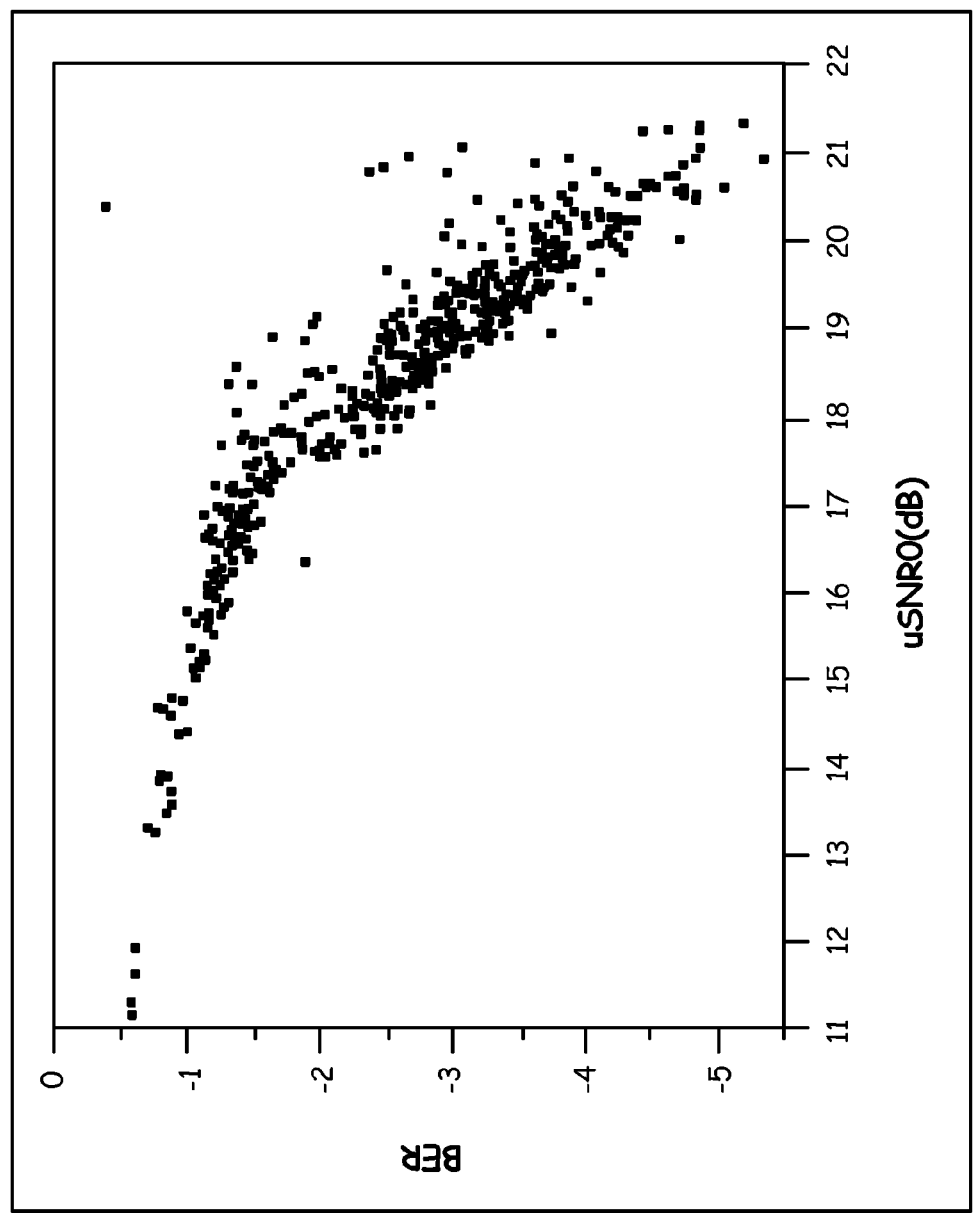
FIG. 8 is a chart illustrating the correlation between measured signal-to-noise ratio (SNR) and bit error rate (BER) as recognized by an embodiment of the present invention.

FIG. 8 is a chart illustrating the relationship between micro-transition signal-to-noise ratios (SNRs) and bit error rates (BER). In the embodiment shown in FIG. 8, the horizontal or x-axis represents the logarithm of micro-transition SNRs expressed in units of decibels (dB). The vertical or y-axis represents BER, and is expressed in units of log probability of generating a bit error. For example, a value of −2 represents a probability of one error bit per every one-hundred bits (e.g., log 1/100=−2). A value of −1 therefore represents a probability of one error bit per every ten bits (e.g., log 1/10=−1). Therefore, a BER value of −1 indicates a higher probability of bit errors than a value of −5.

FIG. 8 illustrates the approximately linear correlation between micro-transition SNR and the BER (both expressed as log functions) that allows a determination of micro-transition SNR to be used to estimate BER. In particular, this relationship is highly linear in the range of approximately 17 dB to 21 dB, with each one dB decrease in micro-transition SNR resulting in an approximately one order of magnitude increase in BER (e.g., one error in every one-hundred bits to one error in every ten bits).

This correlation between micro-transition SNR and BER provides a computationally simple and reliable method of determining BER for a data storage system.

Figure 9:
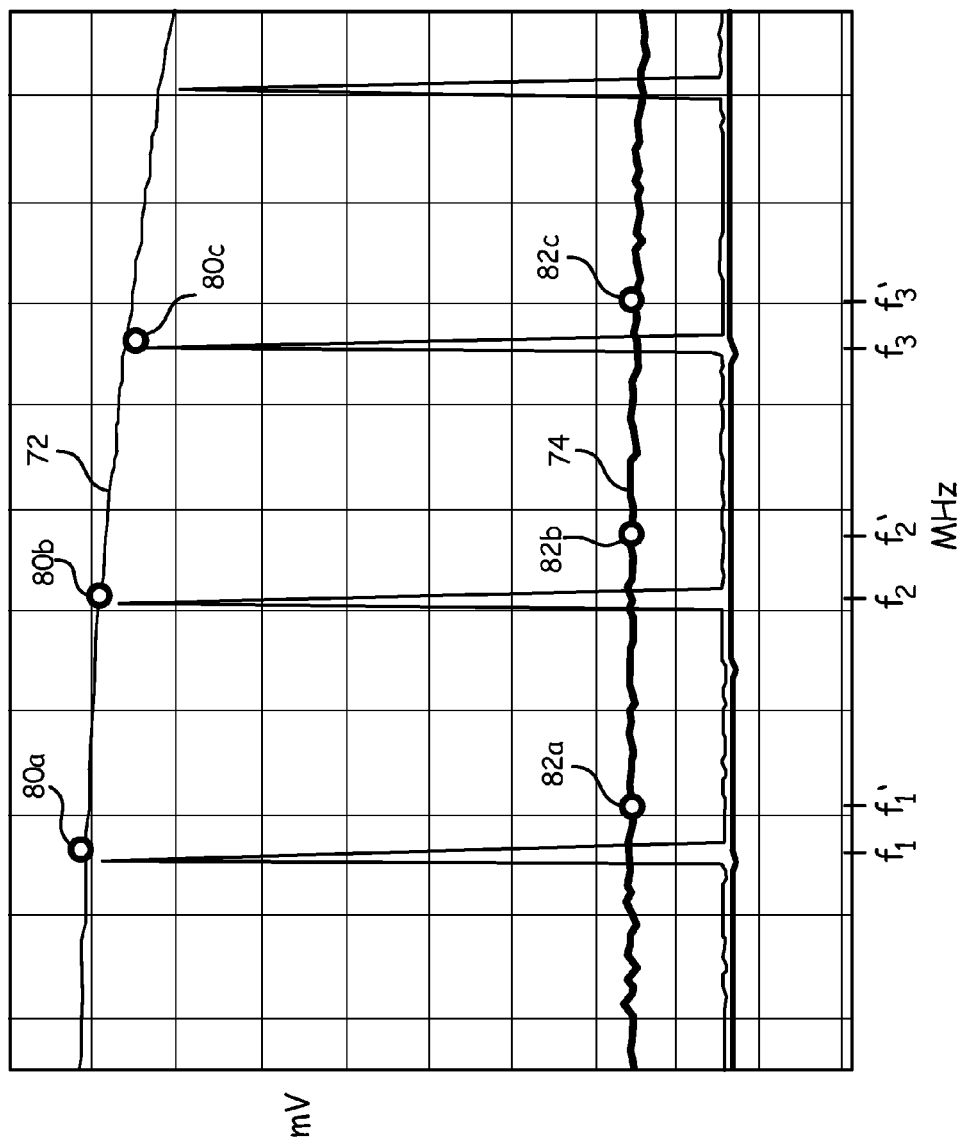
FIG. 9 is a frequency domain diagram illustrating measurement of micro-transition frequency response and noise floor frequency response used to calculate signal-to-noise ratio (SNR) according to an embodiment of the present invention.

FIG. 9 is a frequency domain diagram illustrating amplitude measurements of the micro-transition frequency response (represented by line 72, shown in FIG. 7) to noise floor (represented by line 74, shown in FIG. 7) used to generate a signal-to-noise ratio (SNR) value according to an embodiment of the present invention. In the embodiment shown in FIG. 9, harmonics of the fundamental frequency of the introduced micro-transitions occur at frequencies $f_1$, $f_2$, and $f_3$, and have amplitudes corresponding with points 80a, 80b, and 80c, respectively. In addition, by measuring the amplitude of the frequency response at frequencies near, but not equal to the harmonic frequencies, the noise floor can be measured. For example, in the embodiment shown in FIG. 8, frequency response amplitudes are measured at frequencies $f_1'$, $f_2'$, and $f_3'$ at points 82a, 82b, and 82c, respectively. For example, the frequency $f_1'$ is selected to be proximate or close to frequency $f_1$, without the measured amplitude at frequency $f_1'$ corresponding with the frequency response to the micro-transition. Based on these measurements, the ratio of harmonic amplitude (measured at points 80a, 80b, and 80c) to noise floor (measured at points 82a, 82b, and 82c) represents signal-to-noise ratio (SNR) (i.e., amplitude of micro-transition frequency response divided by the amplitude of the noise floor measured proximate to the measured amplitude).

Figure 10:
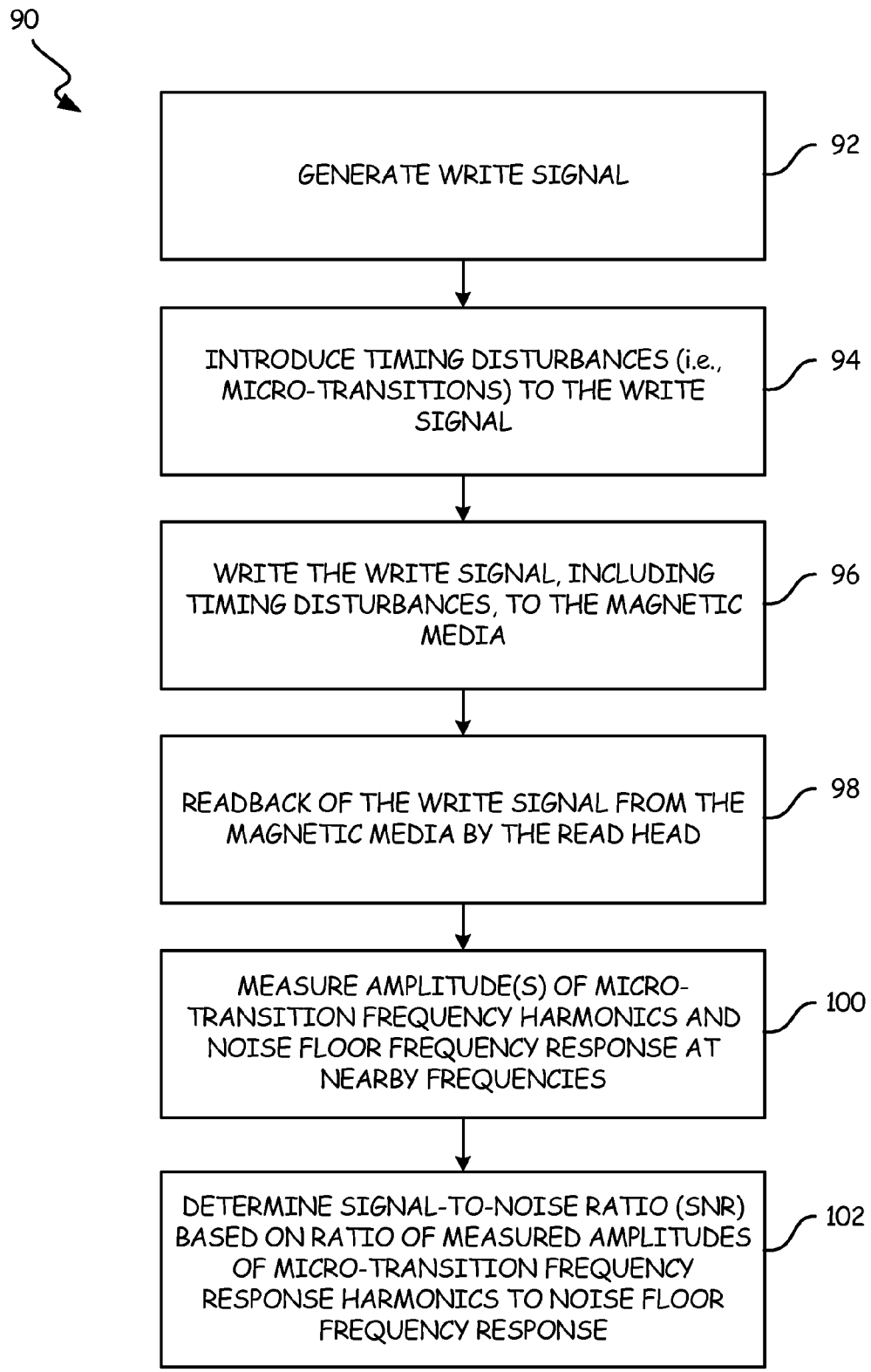
FIG. 10 is a flowchart of a method of estimating signal-to-noise ratio (SNR) based on micro-transition frequency response according to an embodiment of the present invention.

FIG. 10 is a flowchart of method 90 used to signal-to-noise ratio (SNR), which is correlated with bit error rate (BER). As discussed in more detail with respect to FIG. 11, the correlation between SNR and BER means that a decrease in SNR corresponds with an approximately linear degradation in BER. This relationship can be used to correlate changes in SNR measured before and after a stress test to signal degradation (i.e., higher bit-error rate) caused by ATI/XTI effects.

At step 92, a write signal is generated. At step 94, a plurality of micro-transitions are introduced into the write signal, wherein the introduced micro-transitions may be periodic or pseudo-random. At step 96, the write signal, including the introduced micro-transitions, is written to magnetic media 22 via write head 18. At step 98, a read-back signal is generated by read head 20 in response to the write signal written to magnetic media 22.

At step 100, micro-transitions frequency response amplitudes are measured. This may include measuring the amplitude of the fundamental frequency associated with the micro-transition frequency response, harmonics thereof, or a combination of both. In addition, at step 100, noise floor frequency response amplitudes are measured by measuring the frequency response amplitude at frequencies proximate to or nearby the measured micro-transition harmonics. This may include selecting a frequency slightly higher than, or slightly lower than the frequency of the micro-transition harmonic (or fundamental). The ratio of measured amplitudes represents a signal-to-noise ratio (SNR) referred to as a micro-transition SNR value to indicate that it is based on micro-transition frequency response amplitudes.

At step 102, the measured amplitudes are used to determine micro-transition signal-to-noise ratios (SNR). In particular, the ratio of the micro-transition frequency response amplitude to the noise floor amplitude represented the micro-transition SNR. As discussed with respect to FIG. 8, there is an approximately linear correlation between the SNR and BER. Thus, as described in more detail with respect to FIG. 11, below, SNR values calculated according to method 90 can be used to detect degradation of signal quality. In particular, by measuring micro-transition SNR values pre stress test and post stress test, the change in measured SNR values can be correlated with signal degradation (i.e., increase in BER). In this way, method 100 provides a computationally simple, efficient, and effective manner of calculating a signal to noise ratio (i.e., micro-transition SNR values) that are useful in detecting signal degradation. In particular, the SNR value calculated with respect to the micro-transition frequency response can also be used in combination with a stress test process to detect adjacent track interference (ATI) and far track interference (FTI), as described with respect to FIG. 11 below.

Figure 11:
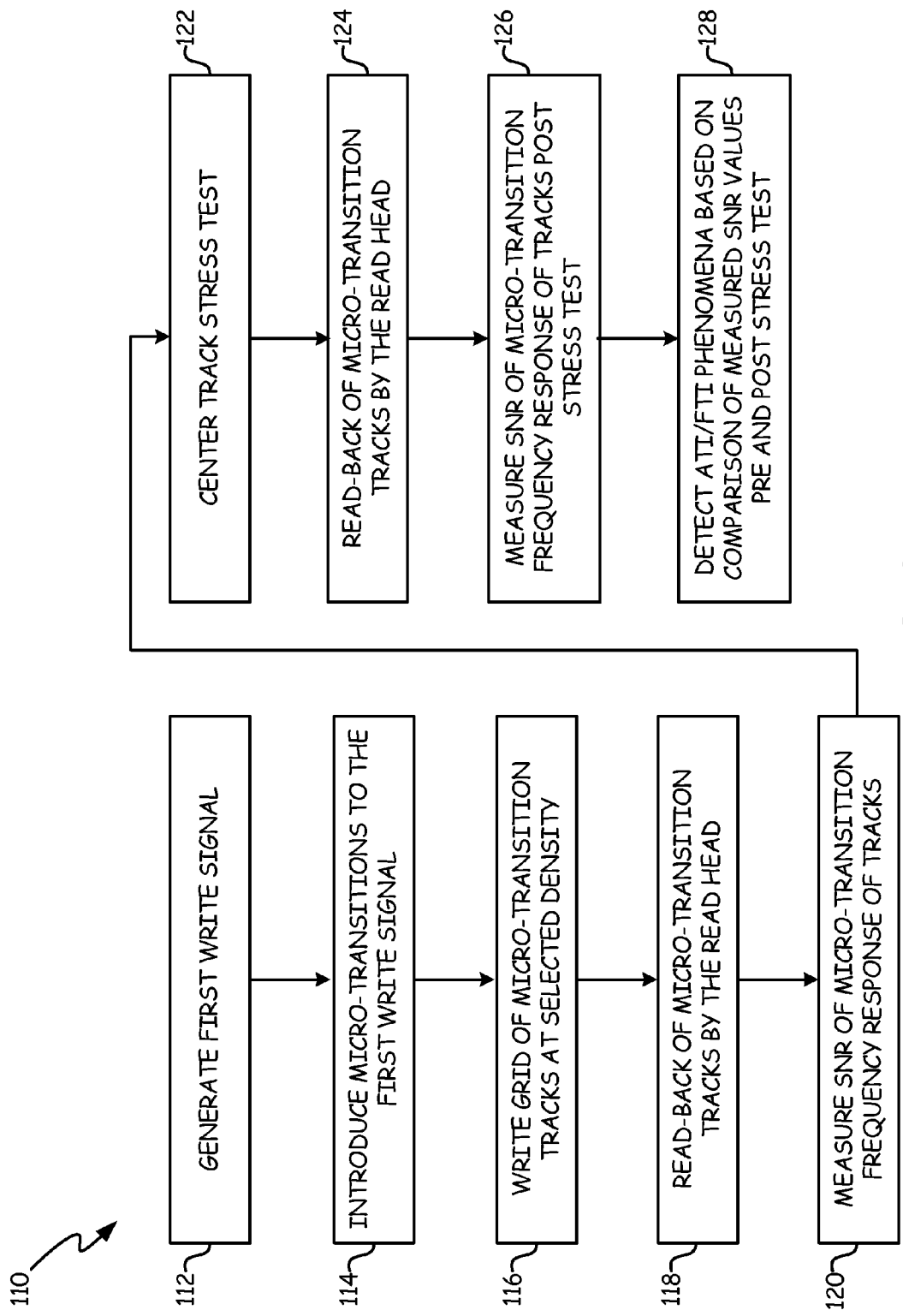
FIG. 11 is a flowchart of a method of detecting adjacent track interference (ATI)/far track interference (FTI) according to an embodiment of the present invention.

FIG. 11 is a flowchart of method 110 of detecting adjacent track interference (ATI)/far track interference (FTI) phenomena according to an embodiment of the present invention. In general, the method includes once again introducing micro-transitions into a plurality of write signals that are written to a magnetic media. Read-back of the data write signal is done before and after stress test writing of a center track, and micro-transition SNR is measured with respect to both as described with respect to FIGS. 9 and 10. Degradation of the data write signal is determined based on the change in the measured SNR values, which in turn is indicative of ATI/FTI effects caused by the stress test.

In particular, at step 112 a first plurality of write signals are generated and/or provided. For example, in one embodiment the first plurality of write signals are characterized as square wave signals have a fixed period. At step 114, a first plurality of micro-transitions are introduced into the first plurality of write signals. At step 116, the first plurality of write signals (including first plurality of micro-transitions) is written in a grid-like format to the magnetic media 22 via write head 18. The term "grid" is used here to denote that the write signals are written at a plurality of track locations spaced around a center track. In one embodiment, the plurality of write signals are evenly spaced at a selected density on both sides of a center track. The density of the write signals is defined as the number of tracks in a given areal density, and is defined by how closely the tracks can be located adjacent to one another (i.e., track pitch).

At step 118, read-back signals are generated by read head 20 in response to the each of the plurality of write signals written to magnetic media 22. At step 120, a micro-transition SNR values is calculated based on the micro-transition frequency response. For example, as described with respect to FIGS. 9 and 10, above, micro-transition SNR is measured based on the ratio of the measured amplitudes of the micro-transition frequency response (i.e., fundamental frequency response and harmonics thereof) to a noise floor value. The measured micro-transition SNR values for the plurality of tracks is then stored.

At step 122, the center track (about which, the other plurality of write signals are written) is stressed through repeated writing of the center track. For example, in one embodiment the center track stress test includes approximately 10,000 writes to the center track.

At step 124, read-back signals are generated by read head 20 in response to the each of the plurality of write signals written to magnetic media 22. The read-back signal generated at step 124 is in response to the same data write tracks read back at step 118 prior to the stress test. At step 126, the micro-transition SNR associated with the read-back signal is calculated as described with respect to step 120. At step 128, ATI/FTI phenomena is detected based on a comparison of SNR values measured before and after the center track stress test. For example, no change in detected SNR values measured before and after the center track stress test indicates little or no degradation in the adjacent or non-adjacent tracks due to ATI/FTI phenomena. In contrast, a decrease in SNR values measured after center track stress test indicates degradation in signal strength due to ATI/FTI effects. Based on the comparison of the SNR values, ATI/FTI effects can be determined. A benefit of the embodiment described with respect to FIG. 11 is that it provides a computationally simple and time-effective manner of measuring ATI/FTI effects through the introduction, read-back, and frequency response of micro-transitions.

Figure 12:
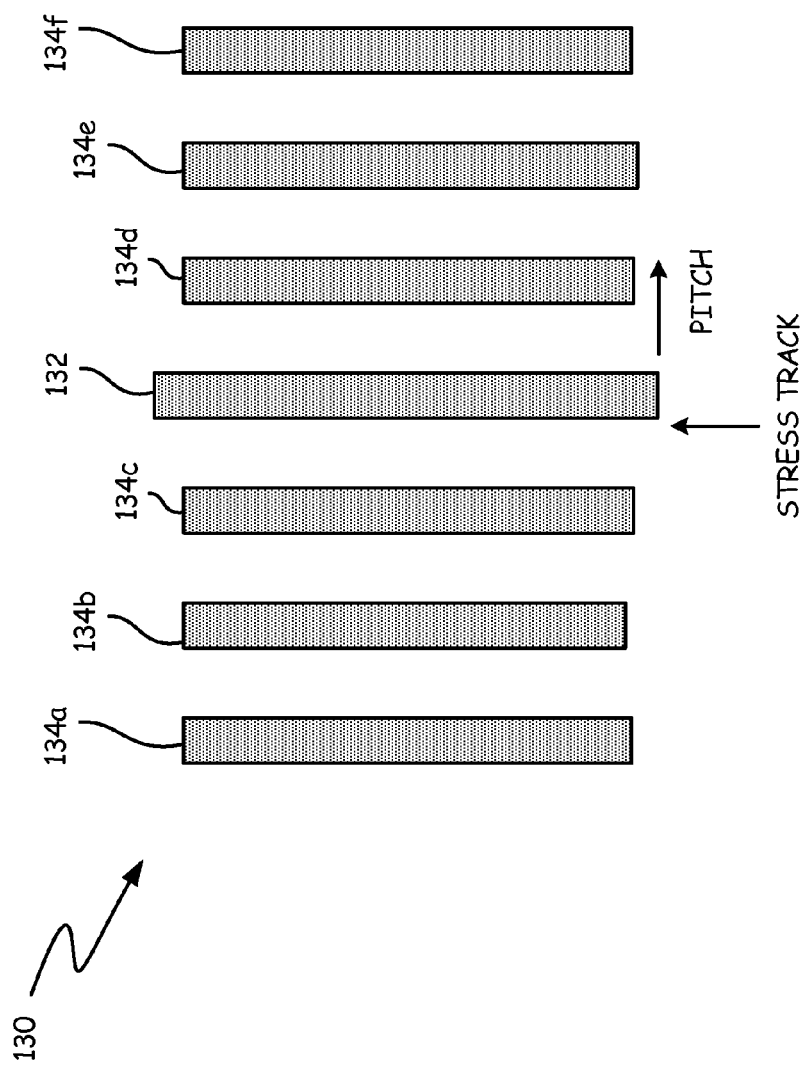
FIG. 12 is a schematic diagram illustrating spacing between a plurality of data write tracks according to an embodiment of the present invention.

FIG. 12 is a simple schematic diagram illustrating spacing between write tracks written to magnetic media 130 according to the method described with respect to FIG. 11 for detecting ATI/FTI effects. In particular, FIG. 12 is represented as linear tracks, rather than concentric tracks spaced around a circular magnetic media, although the same concepts apply for purposes of this discussion. In particular, magnetic media 130 includes center track 132, and adjacent write tracks 134a-134f spaced evenly on either side of center track 132. A distance between adjacent tracks is referred to as track "pitch", and for successful read/write operations is required to have a minimum distance. With respect to the method described with respect to FIG. 11, data tracks including introduced micro-transitions are written to data tracks 134a-134f. The data tracks are subsequently read, generating read-back signals that are analyzed in the frequency domain to calculate micro-transition SNR values for each data track. Subsequently, center track 132 is stressed via a plurality (e.g., 10,000) write operations. ATI/FTI effects associated with the center track stress test will result in corresponding degradation of signals previously written to data tracks 134a-134f. Following the stress test, data tracks are once again read, generating read-back signals that are analyzed in the frequency domain to calculate micro-transition SNR values for each data track. These micro-transition SNR values are compared with one another to detect ATI/FTI effects associated with each data track 134a-134f. Based on the tracks experiencing degradation, the location of "hot spots" associated with ATI/FTI relative to center track 132 can be determined. For example, if micro-transition SNR calculated for write track 134f indicates high signal degradation, and write track 134f is located approximately 200 nanometers (nm) to the right of center track 132, then it can be determined that FTI effects are particularly problematic 200 nm to the right of center track 132.

Figure 13:
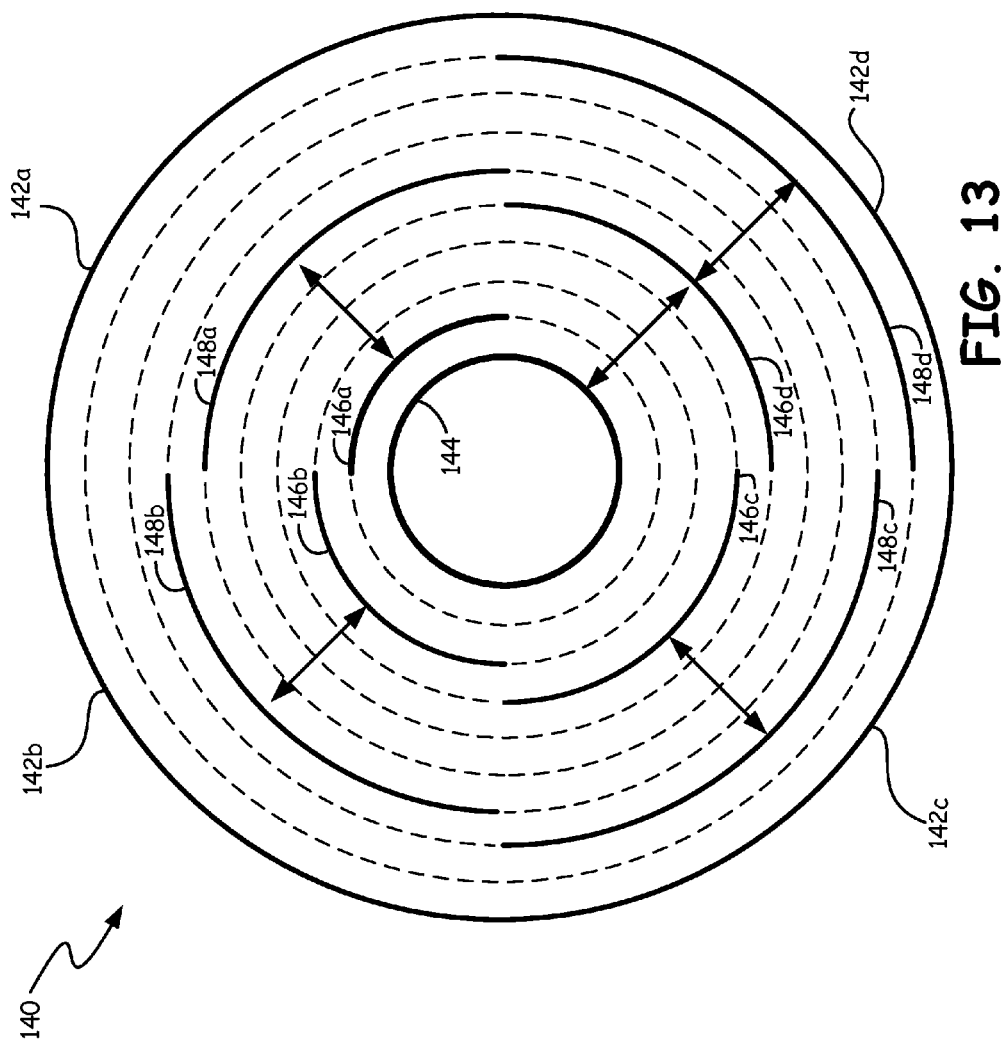
FIG. 13 is a schematic diagram illustrating spacing between a plurality of data write tracks according to another embodiment of the present invention.

However, a drawback of this configuration is that ATI/FTI effects falling within the space between adjacent write tracks (e.g., in the white space between write tracks 134c and 134f) will be undetected. That is, the resolution of the ATI/FTI test is limited in part to the spacing of write tracks 134a-134f. FIG. 13 illustrates another configuration of write tracks (illustrated as concentric write tracks) that provides higher resolution than the embodiment shown in FIG. 12.

FIG. 13 is a schematic, top view of tracks written to magnetic media 140 as part of an ATI/FTI test method according to an embodiment of the present invention. In the embodiment shown in FIG. 13, magnetic media 140 is divided into four sectors, labeled 142a-142d. Center track 144 is written at a radial distance that remains constant in each of the four sectors. A plurality of write tracks 146a-146d, and 148a-148d are spaced around center track 144. However, rather than a single concentric track located at a fixed distance relative to center track 144, each write track is written at different radial locations relative to center track 144 in each of the different sectors 142a-142d. For example, the write track located proximate to center track 144 is comprised of write tracks 146a-146d. Write track 146a (located in sector 142a) is located radially closest to center track 144, while write track 146b is located slightly farther away, and write track 146c is located farther away, and write track 146d is located farthest from center track 144. In this way, data tracks including introduced micro-transitions are written to write tracks 146a-146d, and the subsequent read-back of signals associated with write tracks 146a-146d provides information regarding ATI/FTI effects at four different locations relative to center track 144. In this way, by dividing magnetic media 140 into a plurality of sectors 142a-142d and writing data tracks at different radial locations with respect to each sector, additional resolution is obtained with respect to ATI/FTI effects. In effect, this write track topology provides a sort of "spiral" like write track from which to obtain ATI/FTI. Contrasted with the embodiment shown in FIG. 12, the embodiment shown in FIG. 13 would provide ATI/FTI information in the white spaces located between adjacent data tracks (e.g., between 134a and 134b).

As described with respect to the above-embodiments, the present invention provides a system and method of detecting ATI/FTI effects by introducing timing disturbances (i.e., micro-transitions) into data write signals and analyzing the frequency response to the introduced disturbances in the read-back signal. In particular, signal-to-noise ratio (SNR) values are calculated based on micro-transition frequency response both before and after stress testing of a center track. Resulting changes in the calculated micro-transition SNR values are indicative or ATI/FTI effects associated with the data storage device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of detecting adjacent track interference (ATI)/far track interference (FTI) in a data storage system, the method comprising:
introducing micro-transitions into a data write pattern;
writing the data write pattern, including introduced micro-transitions, to a magnetic media at one or more radial positions relative to a center track;
generating a first read-back signal in response to the data write pattern written to the magnetic media;
analyzing a frequency response of the first read-back signal that includes analysis of micro-transition frequency response to determine first signal-to-noise ratios (SNRs) associated with the data write pattern written to the magnetic media;
conducting a stress test by repeatedly writing data to the center track for a number of iterations;
generating a second read-back signal in response to the data write pattern written to the magnetic media; and
analyzing a frequency response of the second read-back signal that includes analysis of micro-transition frequency response to determine second SNRs associated with the data write pattern written to the magnetic media, wherein ATI/FTI effects are determined based on detected changes between the first SNRs and second SNRs.

2. The method of claim 1, wherein analyzing the frequency response of the first read-back signal includes:
measuring a first amplitude of the micro-transition frequency response at a first frequency;
measuring a second amplitude of the frequency response at a second frequency proximate to the first frequency; and
calculating the first SNRs based on the first and second measured amplitudes.

3. The method of claim 1, wherein writing the data write pattern, including introduced micro-transitions, to a magnetic media at one or more data write tracks includes for each data write track, varying a radial position of the data write track relative to the center track based on a sector of the magnetic disk being written.

4. The method of claim 1, wherein the first plurality of micro-transitions have a length less than 25% of a period of the first data write pattern.

5. The method of claim 1, wherein the first plurality of micro-transitions have a length of approximately 10% of a period of the first data write pattern.

6. A system for testing data storage systems, the system comprising:
a micro-transition generator that introduces micro-transitions into a first data write signal;
a write head that writes the first data write signal, including introduced micro-transitions, to a magnetic media;
a read head that generates a first read-back signal in response to the first data write signal written to the magnetic media; and
a spectrum analyzer that converts the first read-back signal to a frequency domain, and measures a signal-to-noise ratio (SNR) based on a measured amplitude of a micro-transition frequency response and noise floor, wherein the spectrum analyzer measures the noise floor by measuring amplitude at a frequency adjacent to a harmonic frequency of the micro-transition frequency response.

7. The system of claim 6, wherein the system tests for adjacent track interference (ATI)/far track interference (FTI) by repeatedly writing via the write head a center track, generating a second read-back signal via the read-head following the repeated writes to the center track in response to the first data write signal written to the magnetic media, the first data write signal written to tracks both proximate and distal to the center track, measuring via the spectral analyzer the SNR in response to the second read-back signal, wherein ATI/FTI effects are determined by the spectral analyzer based on change in the SNR.

8. The system of claim 7, wherein each data track associated with the first data write signal written to the magnetic media is written to a radial location that varies relative to the center track based on sector of the magnetic media being written.

9. A system for detecting adjacent track interference (ATI)/far track interference (FTI) in a data storage system, the system comprising:
a micro-transition generator that introduces micro-transitions into first data write patterns;
a write head that writes the first data write patterns, including introduced micro-transitions, to a magnetic media at one or more radial positions relative to center track, and performs stress tests by repeatedly writing data to the center track of the magnetic media after the first data write patterns have been written to the magnetic media;
a read head that generates a first read-back signal in response to the data write pattern prior to the stress test and generates a second read-back signal in response to the data write pattern subsequent to the stress test; and
means for analyzing in a frequency domain the first read-back signal and the second read-back signal, wherein the spectrum analyzer calculates first and second signal-to-noise ratios (SNR) for the first read-back signal and the second read-back signal, respectively, based on micro-transition frequency response of the first and second read-back signals, wherein ATI/FTI effects are determined based on detected changes between the first SNRs and second SNRs.

10. The system of claim 9, wherein the means for analyzing in a frequency domain the first read-back signal and the second read-back signal is a spectrum analyzer.

11. The system of claim 9, wherein the means for analyzing in a frequency domain the first read-back signal and the second read-back signal is a discrete Fourier transform (DFT) circuit.

12. The system of claim 9, wherein the means for analyzing in a frequency domain the first read-back signal and the second read-back signal measures with respect to each read-back signal a first amplitude of the micro-transition frequency response at a first frequency, a second amplitude of the frequency response at a second frequency proximate to the first frequency, and calculates SNRs for each read-back signal based on the first and second measured amplitudes.

13. The system of claim 9, wherein the first data write pattern written to the magnetic media by the write head is written at varying radial positions relative to the center track based on a sector of the magnetic disk being written.

* * * * *